United States Patent [19]

Brunn et al.

[11] Patent Number: 4,701,221
[45] Date of Patent: Oct. 20, 1987

[54] PROCESS FOR THE PRODUCTION OF BLACK PIGMENTS BASED ON IRON

[75] Inventors: Horst Brunn, Meerbusch; Gerd-Hermann Schulten, Duisburg; Werner Fuhr, Krefeld, all of Fed. Rep. of Germany

[73] Assignee: Bayer Aktiengesellschaft, Leverkusen, Fed. Rep. of Germany

[21] Appl. No.: 861,453

[22] Filed: May 9, 1986

[30] Foreign Application Priority Data

May 21, 1985 [DE] Fed. Rep. of Germany ....... 3518093

[51] Int. Cl.[4] .......................... C04B 3/00; C04B 14/00
[52] U.S. Cl. .................................... 106/304; 106/309; 423/633
[58] Field of Search ................. 106/304, 309; 423/633

[56] References Cited

U.S. PATENT DOCUMENTS

| | | | |
|---|---|---|---|
| 857,044 | 6/1907 | Fireman | 106/304 |
| 2,656,282 | 10/1953 | Clarke | 106/304 |
| 3,970,738 | 7/1976 | Matsul et al. | 423/633 |
| 4,123,501 | 10/1978 | Kohler | 106/304 |

*Primary Examiner*—Theodore Morris
*Attorney, Agent, or Firm*—Connolly & Hutz

[57] ABSTRACT

A process for the production of black iron oxide pigments having a magnetite structure from iron ion-containing acidic waste water which comprises precipitating the iron ions with alkaline substances in a first stage at ambient temperature to produce a raw slurry and in a second stage, concentrating the raw slurry adjusted to a pH of from 5.0 to 8.0 with acidic substances and then ripening the concentrated slurry at temperatures above 70° C.

10 Claims, No Drawings

PROCESS FOR THE PRODUCTION OF BLACK PIGMENTS BASED ON IRON

This invention relates to a process for the production of black iron-based pigments having a magnetite structure from iron ion-containing acidic waste water, the metal ions being precipitated in a first stage at ambient temperature by the addition of pH basic substances to raw precipitation slurry and in a second stage concentrating the slurry, adjusting the slurry pH to 5 to 8 and ripening the slurry at temperatures above 70° C.

BACKGROUND OF THE INVENTION

Black pigments are iron-(II,III) oxides having a magnetite structure. In addition, mixed oxides rich in iron also exist, such as bixbyite, a manganese-containing iron-(III) oxide, which likewise produce very bluish-tinged black pigments. Iron oxide black pigments are generally produced by oxidizing metallic and/or divalent iron (precipitation process or aniline process) or by reacting trivalent iron compounds, optionally under reduction conditions (calcination or thermolysis process).

The conventional production of iron-(II,III) oxides having a magnetite structure from an aqueous medium is by the oxidation of iron-(II) salts at elevated temperatures (Masao Kiyama, Bull. chem. Soc. Japan, Vol 47 (7), pages 1646 to 1605 (1974). In this process, concentrated iron salt solutions are generally used as starting materials. Such solutions occur, for example, as waste solutions in pickling plants or as titanium-containing by-product in the production of titanium dioxide by the so-called "sulphate process". The crude materials are correspondingly predominantly iron-(II) sulphates and/or chlorides generally having concentrations of from 150 to 250 g of salt/l in the case of iron-(II) sulphate and from 200 to 400 g of salt/l in the case of iron-(II) chloride.

In the present context, acidic waste waters are iron-containing waters having metal salt contents of less than 100 g/l, preferably less than 25 g/l. These occur, for example, in the production of iron oxide pigments from washing filtrates. Water from sewage works, which in a third stage has to be subjected to a subsequent precipitation with adsorption on iron hydroxide for clearing and purifying heavy metals and phosphate ions, is also a suitable starting material according to the present invention. A common feature of all the waste waters is that the amount of water, as compared to the amount of iron to be separated, is so large that an economical production of pigment quality iron oxide by the precipitation process with a temperature increase of the salt solution of greater than 50° C. is not possible. Such waste waters are conventionally neutralized at ambient temperature under oxidation conditions (possibly recovering contact slurry), so as to dissociate all iron ions including foreign ions. Due to the inhomogeneity of such precipitates (all phases between iron oxide, iron oxide hydroxide and pure iron hydroxide may be present), they are not suitable as starting materials for ferrites and pigments.

An object of the present invention is thus to provide a process which allows the economical production of high-quality iron oxide pigments from the waste waters thereof.

BRIEF DESCRIPTION OF THE INVENTION

The present invention thus provides a process for the production of black pigments based on iron having a magnetite structure from iron ion-containing acidic waste water, in which, in a first state, the precipitation of the metal ions from raw waste water is carried out at ambient temperature using basic substances, and, in a second stage, the raw slurry from the first stage is concentrated, adjusted to a pH of from 5.0 to 8.0 using acidic substances and subjected to a ripening process at temperatures above 70° C.

DETAILED DESCRIPTION

The waste water is treated in the first stage at ambient temperature with alkalis under oxidation conditions and with the recovery of contact slurry or at the start of the reaction by introducing $Fe_3O_4$ seeds such that a pH of greater than 8.0 and an iron-(III)/iron-(II) ratio of from 1.0 to 2.4 exists.

The raw slurry precipitation is preferably carried out such that a $Fe^{3+}/Fe^{2+}$ ratio of from 1.5 to 2.4 exists.

The adjustment of the $Fe^{3+}/Fe^{2+}$ ratio is thereby particularly elegantly regulated by air oxidation or by addition of $Fe^{2+}$ salts, if necessary. So as to render the process economical, the raw slurry is concentrated to a solids content of from 200 to 1200 g/l.

The pH adjustment of the raw slurry takes place according to the present invention by addition of sulphuric acid or acidic waste water. The pH adjustment is thereby advantageously undertaken to a pH of from 6.5 to 7.5. The ripening of the raw slurry takes place according to the present invention at temperatures of from 70° to 100° C. It is particularly advantageous with this method only to undertake the pH adjustment when the elevated temperature is reached.

However, equally advantageous is the embodiment of the process wherein the raw slurry, the pH of which has been adjusted, is subjected to a ripening process at temperatures above 100° C. under autoclave conditions. Ripening, whether by stirring the raw slurry at elevated temperatures or by use of an autoclave, is a heat treatment of the slurry. The duration of time required depends on the temperature and less time is required for ripening at higher temperatures. Generally a time period of from 15 minutes to about 3 hours is required. To get the best results, the process of ripening is finished, when the slurry has reached the wanted color quality.

Filtering and washing is then carried out and, depending of the marketing form, the filter cake is either liquefied or dried and ground. By this series of measures, the processing of waste water and the production of black pigments may be suprisingly combined such that they lead to good results both from the ecological and from the economical point of view.

Acidic waste waters are used according to the present invention, wherein the iron ions represent the main constituent of the metal salt content. It is thereby unimportant for the process whether the iron ions are themselves the impurities or whether they are firstly added to the waste water, for example as absorber in sewage words. It is important for the present process that the iron concentration in the formed solid precipitate is at least 80%, preferably 90%, of the total metal content. The foreign metal proportion comprises, for example for the producers of pigments, predominantly divalent 3-d metals, such as manganese, zinc etc. However, other metal ions, such as the metal ions nickel, cobalt, chromium from the third sewage purification stages may represent the foreign proportion of the acidic waste water. The content of trivalent iron ions should not exceed 70% of the total iron, and the divalent proportion should not fall below 30%. Otherwise, as great a quantity of iron-(II) salts, such as iron sulphate or iron-(II) chloride, may be metered into the waste water such that the above ratio of at least 7:3 is obtained. The total concentration of salts to be precipitated should thereby be below 100 g of salt/l, preferably below 25 g of salt/l.

The metal salt acidic waste water having an iron-(III)/iron-(II) ratio of less than 2.4 and an iron content of at least 80%, based on the total metal content, is immediately adjusted to a pH of greater than 8.0, preferably greater than 8.5, at ambient temperature with alkalis, preferably sodium hydroxide solution, recovering contact slurry or introducing $Fe_3O_4$ seeds at the start of the reaction. If the iron-(III)/iron-(II) ratio is below 1.5, then precipitation is carried out in an oxidizing manner. Air is preferably used as oxidizing agent. The oxidation may also take place, however, using peroxides or dichromate or permanganate waste liquors. The foreign metal-containing iron oxide/hydroxide mixture precipitated on the contact slurry is advantageously freed from the waste water by gravitational thickening. However, other solid liquid separating assemblies, such as filters, centrifuges or magnetic separators, may also be used. A portion of the precipitated solids is continuously circulated as contact slurry, as mentioned above. The circulation rate of the solids is calculated such that at least 10 times advantageously from 20 to 50 times of the metal ions which are to precipitate calculated as $Me(OH)_2$ are circulated. At the beginning of the reaction, the seed composition is circulated until the particles thereof have a specific surface area of less than 40 m²/g, advantageously less than 20 m²/g. The solids material suspension immediately transferred outwards with, depending on the separating assembly, solids contents of greater than 200 g/l, comprises particles, the specific surface area of which varies from 5 to 40 m²/g in the range of the pigments according to the circulation rate and the residence time. With respect to color, they are, however, rather to be classified as weak-tinged, greenish (depending on the FeOOH proportion) brown pigments.

From the resulting raw slurry, a strong-tinged bluish black pigment is surprisingly obtained when the concentrated solids suspension is adjusted with acids and/or salts to a pH of from 5 to 8.0, preferably from 6.5 to 7.5, and is stirred for a comparatively short time at temperatures of greater than 70° C., preferably from 80° to 100° C. The known mineral acids, such as HCl and $H_2SO_4$ may be used as acids. A preferred embodiment of the process according to the present invention is, however, the use of metal salts, such as iron and aluminium salts etc, whereby the use as the starting material of the acidic, metal salt-containing waste water itself is particularly preferred. In the case of the thermal treatment of the suspension, the residence time is in reverse proportion to the temperature, whereby 3 h at 70° C. corresponds to about 15 min at 100° C. Greater deviations from the ideal iron-(III)/iron-(II) ratio in the suspension may thereby be compensated either by oxidation (preferably at $Fe^{3+}/Fe^{2+}$ values of less than 1.8) or by addition of iron-(II) salts and alkalis while maintaining the pH from 6.5 to 7.5 (preferably at $Fe^{3+}/Fe^{2+}$ values greater than 2.0).

As an alternative to tempering the slurry in the defined pH range, a treatment in an autoclave may also be carried out. Solids contents such as occur with filter cakes having from 1000 to 1200 g of solids/l max thereby be processed in a Konti tube reactor, optionally with the aid of liquefiers.

The working-up of the suspension takes place by filtration with thorough washing. If the black pigment is to be marketed in slurry form, then the concluding stage is the liquefication of the filter cake with the aid of marketable liquefiers. For the production of powder products, the filter cake is dried and ground.

The black pigment having a magnetite structure obtained according to the present invention has a BET surface area of from 3 to 20 m²/g, preferably from 5 to 15 m²/g. Decisive for the BET surface area of the end product is that of the raw slurry occuring at room temperature, which may be controlled, as known, via the residence time or growth rate. The thermal treatment in the second stage may, however, reduce the specific surface area of the crude material by up to 50%. Thus, the BET surface area, starting from raw slurries of less than 10 m²/g, only slightly decreases in the thermal subsequent treatment, while other starting materials fall from 40 m²/g to 20 m²/g due to the tempering at greater than 70° C. With the pigments produced according to the present invention having surface areas greater than 12 m²/g and which are to be marketed in powder form, the thermostabilization according to the prior art may either be undertaken via the subsequent treatment with surface-protective substances (for example N-containing heterocycles) or by lowering the FeO content. In the latter case, the possibility arises of raising the iron-(III)/iron-(II) ratio by intensified oxidation with, for example, air.

The pigments produced according to the present invention are classified, with respect to objective color measurement and evaluation in the CIELAB-system (DIN 6174), in the marketable range of iron oxide black pigments. THe area of use of such pigments is principally the pigmentation of lacquers, plastics materials and concrete parts.

The process according to the present invention will now be explained in more detail by means of the following non-limiting Examples.

EXAMPLE 1

Warm waste water, from 25° to 30° C., from iron oxide producing having an average metal content of 1.5 g/l (the concentration may fluctuate above and below by a factor of 10) is added to the precipitation vessel with an average volume flow of 120 l/h (fluctuation range from 40 to 180 l/h). The composition of the metal content is as follows:

About 90% is composed of salt (chloride/sulphate) (the Fe proportion is greater than 90%).

About 10% reaches the precipitation vessel via entrained pigment quantities. Furthermore, the waste water flow contains flocculated iron-(III) hydroxide as a result of hydrolysis at a pH greater than 4.0.

At the start of reaction, $Fe_3O_4$ pigment (BET surface area 16 m²/g) is introduced as contact slurry in a mass flow of about 5 kg/h (corresponding to a 20 fold seed introduction), and as soon as the subsequent thickening in the thickener exceeds the concentration of 200 g/l (with a maximum return flow of 25 l/h), the system is circulated. The return flow concentration rises to values between 300 and 500 g/l over a period. The precipitation of the added soluble metal content takes place with sodium hydroxide solution (30%, by weight) at a pH of 8.5. The oxidation with air is undertaken via a gassing stirrer. The raw slurry data obtained according to the growth factor, the temperature and the air quantity are set out in Table 1.

The given color data are measured in the white waste (mixture of the dried slurry with a commercial titanium dioxide white pigment in the weight ratio 1:5) according to DIN 53 236. The CIELAB-C/$2_{grd}$ color values converted according to DIN 6174 produce, shown in comparison with the commercial product Bayferrox 318 in Alkydal F 48 lacquer (both trademarks of Bayer A.G.) weak-tinged, substantially brownish-tinged pigments (note: positive $\Delta a^*$ and $\Delta b^*$ values represent brownish tinge, negative values thereby represent bluish tinge).

color, the product corresponds to Bayferrox® 320 ($\Delta a^* = 0.0$; $\Delta b^* = -0.1$; % $F_{rel} = 103$) commercial product by Bayer AG.

EXAMPLE 4

The raw slurry No B produced according to Example 1, having a solids content of 400 g/l, is adjusted to a pH of 7.3 using sulphuric acid (20%, by weight ). The suspension is then immediately tempered in an autoclave for 10 min at 160° C. After working-up (filtering, washing, drying, grinding) a black pigment ($\Delta a^* = 0.1$; $\Delta b^* = 0$) which has a specific BET surface area of 10.4 m²/g is obtained which is stronger-tinged by 15% in comparison with Bayferrox® 318 M, a commercial product by Bayer AG.

TABLE 1

| Raw Slurry | T °C. | Reaction conditions | | | Raw slurry characteristic sizes | | | | |
| | | growth factor | air quantity m³/h | BET m²/g | $Fe^{3+}/Fe^{2+}$ | color data[1] | | | |
| | | | | | | $\Delta a^*$ | $\Delta b^*$ | % $F_{rel}$ |
| --- | --- | --- | --- | --- | --- | --- | --- | --- |
| A | 30 | 20 | 3 | 20 | 1.78 | +0.4 | +5.8 | 70 |
| B | 25 | 15 | 3 | 36 | 1.67 | +0.3 | +5.9 | 76 |
| C | 30 | 30 | 3 | 12 | 1.91 | 0 | +4.6 | 56 |
| D | 30 | 20 | 1 | 28 | 1.36 | +0.4 | +6.4 | 68 |

[1] based on Bayferrox ® 318

TABLE 2

| Pigment | Raw Slurry | T (°C.) | t (h) | pH | BET (m²/g) | color data | | | based on Bayferrox ® |
| | | | | | | $\Delta a^*$ | $\Delta b^*$ | % $F_{rel}$ | |
| --- | --- | --- | --- | --- | --- | --- | --- | --- | --- |
| 1 | A | 70 | 3.0 | 7.0 | 12.5 | 0.2 | 0 | 100 | 320 |
| 2 | A | 90 | 1.0 | 6.5 | 10.8 | 0.1 | 0.2 | 96 | 320 |
| 3 | B | 95 | 0.5 | 6.0 | 15.3 | 0.1 | 0.5 | 102 | 320 |
| 4 | C | 80 | 1.5 | 7.8 | 9.8 | 0.1 | 0.2 | 106 | 318 |
| 5 | C | 90 | 1.0 | 7.0 | 9.2 | 0 | 0.2 | 100 | 318 |

EXAMPLE 2

The raw slurries A–C present according to Example 1 having a solids content of about 400 g/l are heated in the course of 30 min to temperatures above 70° C. The pH given in Table 2 is adjusted using an iron sulphate solution (220 g/l). The residence times to be maintained with stirring at a predetermined temperature are likewise given in Table 2.

The filter cake is generally spray-dried after the filtration and washing process and immediately ground in a pendulum mill. The pigment number 3 occasionally undergoes a different drying treatment. In order to prevent the increasing oxidation sensitivity with increasing BET surface area, the pigment is dried here at an elevated temperature (from 100° to 120° C.) and thus passivated by lowering the FeO content to from 24 to 29%, by weight, based on total iron oxide.

The color measurement of the black pigments obtained according to Example 2 takes place according to the method given in Example 1. They thereby achieve the color level of the comparative pigments without difficulty.

EXAMPLE 3

The procedure is as according to Example 2, pigment No 5 with the additional measure of air oxidation. The $Fe^{3+}/Fe^{2+}$ ratio is raised to 1.9 via the gassing undertaken at 90° C. After the grinding in a pendulum mill, with addition of 0.5%, by weight, of aminotriazole, an oxidation-stable black pigment is obtained having a specific BET surface area of 13.8 m²/g. With respect to

What is claimed is:

1. A process for the production of black iron oxide pigments having a magnetite structure from iron ion-containing acidic waste water which comprises forming a precipitate of iron ions in a ratio of iron(III)/iron(II) of 1.0 to 2.4 with alkaline substances at pH greater than 8 in a first stage at ambient temperature to produce a raw slurry and, in a second stage, concentrating the raw slurry adjusted to a pH of from 5.0 to 8.0 with acidic substances and then ripening the concentrated slurry at temperatures above 70° C.

2. A process according to claim 1 wherein the precipitation produces raw slurry with an $Fe^{3+}/Fe^{2+}$ ratio of from 1.5 to 2.4.

3. A process according to claim 2 wherein the $Fe^{3+}/Fe^{2+}$ ratio is regulated by air oxidation or by addition of $Fe^{2+}$ salts.

4. A process according to claim 1, 2 or 3 wherein the raw slurry is concentrated in the second stage to a solids content of from 200 to 1200 g/l.

5. A process according to claim 1 wherein the pH adjustment in the second stage is by addition of sulphuric acid.

6. A process according to claim 1 wherein the pH adjustment in the second stage is by addition of acidic waste water.

7. A process according to claim 5 or 6 wherein the pH of the raw slurry in the second stage is adjusted to a pH of from 6.5 to 7.5.

8. A process according to claims 1, 2 or 3 wherein the raw slurry in the second stage is brought to temperatures above 70° C. before adjusting the pH.

9. A process according to claim 1, 2 or 3 wherein the ripening of the concentrated slurry in the second stage is at a temperature of from 70° to 100° C.

10. A process according to claim 1, 2 or 3 wherein the ripening of the concentrated slurry in the second stage is at temperatures above 100° C. under autoclave conditions.

* * * * *